US007627468B2

(12) United States Patent
Campbell et al.

(10) Patent No.: US 7,627,468 B2
(45) Date of Patent: Dec. 1, 2009

(54) APPARATUS AND METHOD FOR EXTRACTING SYLLABIC NUCLEI

(75) Inventors: Nick Campbell, Kyoto (JP); Parham Mokhtari, Kyoto (JP)

(73) Assignees: Japan Science and Technology Agency, Saitama (JP); Advanced Telecommunication Research Institute International, Kyoto (JP)

( * ) Notice: Subject to any disclaimer, the term of this patent is extended or adjusted under 35 U.S.C. 154(b) by 595 days.

(21) Appl. No.: 10/514,413

(22) PCT Filed: Feb. 21, 2003

(86) PCT No.: PCT/JP03/01954

§ 371 (c)(1), (2), (4) Date: Nov. 15, 2004

(87) PCT Pub. No.: WO03/098597

PCT Pub. Date: Nov. 27, 2003

(65) Prior Publication Data

US 2005/0246168 A1 Nov. 3, 2005

(30) Foreign Application Priority Data

May 16, 2002 (JP) ............................ 2002-141390

(51) Int. Cl.

*G10L 19/06* (2006.01)
*G10L 11/00* (2006.01)
*G10L 19/14* (2006.01)
*G10L 11/04* (2006.01)
*G10L 11/06* (2006.01)
*G10L 15/00* (2006.01)
*G10L 15/20* (2006.01)

(52) U.S. Cl. ....................... 704/209; 704/200; 704/205; 704/206; 704/207; 704/208; 704/211; 704/214; 704/231; 704/233; 704/236

(58) Field of Classification Search ................. 704/205, 704/206, 207, 208, 209, 231, 233, 275, 272

See application file for complete search history.

(56) References Cited

U.S. PATENT DOCUMENTS 3,649,765 A * 3/1972 Rabiner et al. .............. 704/209

(Continued)

FOREIGN PATENT DOCUMENTS

JP 1-244499 9/1989
JP 10-260697 9/1998
JP 2001-306087 11/2001

OTHER PUBLICATIONS

Wayne Lea; Medress, M.; Skinner, T., "A prosodically guided speech understanding strategy," Acoustics, Speech, and Signal Processing [see also IEEE Transactions on Signal Processing], IEEE Transactions on , vol. 23, No. 1, pp. 30-38, Feb. 1975.*

(Continued)

*Primary Examiner*—David R Hudspeth
*Assistant Examiner*—Paras Shah
(74) *Attorney, Agent, or Firm*—McDermott Will & Emery LLP

(57) ABSTRACT

An apparatus enabling automatic determination of a portion that reliably represents a feature of a speech waveform includes: an acoustic/prosodic analysis unit calculating, from data, distribution of an energy of a prescribed frequency range of the speech waveform on a time axis, and for extracting, among various syllables of the speech waveform, a range that is generated stably, based on the distribution and the pitch of the speech waveform; cepstral analysis unit estimating, based on the spectral distribution of the speech waveform on the time axis, a range of the speech waveform of which change is well controlled by a speaker; and a pseudo-syllabic center extracting unit extracting, as a portion of high reliability of the speech waveform, that range which has been estimated to be the stably generated range and of which change is estimated to be well controlled by the speaker.

13 Claims, 11 Drawing Sheets

U.S. PATENT DOCUMENTS

| | | | | |
|---|---|---|---|---|
| 4,802,223 | A * | 1/1989 | Lin et al. | 704/207 |
| 5,479,560 | A * | 12/1995 | Mekata | 704/209 |
| 5,577,160 | A * | 11/1996 | Hosom et al. | 704/209 |
| 5,596,680 | A * | 1/1997 | Chow et al. | 704/253 |
| 5,630,015 | A * | 5/1997 | Kane et al. | 704/226 |
| 5,675,705 | A * | 10/1997 | Singhal | 704/254 |
| 5,710,865 | A * | 1/1998 | Abe | 704/248 |
| 5,732,392 | A * | 3/1998 | Mizuno et al. | 704/233 |
| 5,893,058 | A * | 4/1999 | Kosaka | 704/254 |
| 5,940,794 | A * | 8/1999 | Abe | 704/253 |
| 6,535,851 | B1 * | 3/2003 | Fanty et al. | 704/249 |
| 7,035,798 | B2 * | 4/2006 | Kobayashi | 704/233 |
| 7,043,430 | B1 * | 5/2006 | Chung et al. | 704/251 |
| 7,231,346 | B2 * | 6/2007 | Yamato et al. | 704/233 |
| 2002/0051955 | A1 | 5/2002 | Okutani et al. | |
| 2003/0014245 | A1 * | 1/2003 | Brandman | 704/205 |
| 2004/0133424 | A1 * | 7/2004 | Ealey et al. | 704/233 |
| 2005/0165604 | A1 * | 7/2005 | Hanazawa | 704/201 |
| 2006/0053003 | A1 * | 3/2006 | Suzuki et al. | 704/216 |

OTHER PUBLICATIONS

Mercier, G.; Callec, A.; Monne, J.; Querre, M.; Trevarain, O., "Automatic segmentation, recognition of phonetic units and training in the KEAL speech recognition system," Acoustics, Speech, and Signal Processing, IEEE International Conference on ICASSP '82. , vol. 7, no., pp. 2000-2003, May 1982.*

Schmidbauer, O., "Syllable-based segment-hypotheses generation in fluently spoken speech using gross articulatory features," Acoustics, Speech, and Signal Processing, IEEE International Conference on ICASSP '87. , vol. 12, no., pp. 391-394, Apr. 1987.*

Ronald W. Schafer and Lawrence R. Rabiner, System for Automatic Formant Analysis of Voiced Speech. J. Acoust. Soc. Am. 47, 634 (1970).*

McCandless, S., "An algorithm for automatic formant extraction using linear prediction spectra," Acoustics, Speech and Signal Processing, IEEE Transactions on , vol. 22, No. 2, pp. 135-141, Apr. 1974.*

De Mori, R.; Laface, P.; Piccolo, E., "Automatic detection and description of syllabic features in continuous speech," Acoustics, Speech and Signal Processing, IEEE Transactions on , vol. 24, No. 5, pp. 365-379, Oct. 1976.*

Medress, M.; Diller, T.; Kloker, D.; Lutton, L.; Oredson, H.; Skinner, T., "An automatic word spotting system for conversational speech," Acoustics, Speech, and Signal Processing, IEEE International Conference on ICASSP '78. , vol. 3, no., pp. 712-717, Apr. 1978.*

. C. Bagshaw, Automatic Prosodic Analysis for Computer Aided Pronunciation Teaching, Ph.D., University of Edinburgh, pp. 1-266, 1994.*

Buckow, Jan / Batliner, Anton / Huber, Richard / Nöth, Elmar / Warnke, Volker / Niemann, Heinrich (1998): "Dovetailing of acoustics and prosody in spontaneous speech recognition", In ICSLP-1998, paper 0336, pp. 1-4.*

Mokhtari, Parham., et al. "Automatic Detection of Acoustic Centres of Reliability for Tagging Paralinguistic Information in Expressive Speech." Proc. 3rd Int. Conf. on Language Resources and Evaluation, 2002, Las Palmas, Canary Islands, Spain pp. 2015-2018.

Mokhtari, Parham., et al. "Perceptual validation of a voice quality parameter AQ automatically measured in acoustic islands of reliability." Proc. Meeting of the Acoust. Soc. Of Japan, 2002, Kanagawa University, Japan, Paper 1-P-25, pp. 401-402.

M. Fujimoto, et al. "Support System for Speech Segment Extraction" A-14, General Conference of the institute of Electronics, Information and Communication Engineers, Spring 1989, pp. 14.

J. Sundberg "The Science of the Singing Voice" Northern Illinois University Press, Dekalb, Illinois, 1987, pp. 74-89.

P. Alku, et al. "Amplitude domain quotient for characterization of the glottal volume velocity waveform estimated by inverse filtering" Speech Communication, 18(2), pp. 131-138, 1996.

D. Hermes "Measurement of pitch by subharmonic summation", J. Acoust. Soc. Am. 83 (1), pp. 267-264 , 1988.

P. Mermelstein "Automatic segmentation of speech into syllabic units", J. Acoust. Soc. Am. 58(4), pp. 880-883, 1975.

W.A. Lea, at al. "Prosodic aids to speech recognition", in Lea, W.A. (ed.), Trends in Speech Recognition, Prentice-Hall, New Jersey, pp. 166-206, 1972.

D. J. Broad, "Format estimation by linear transformation of the LPC cepstrum", J. Accust. Soc. Am. 86(5), pp. 2013-2017, 1989.

P. Mokhtari, et al. "Some articulatory correlates of emotion variability in speech: a preliminary study on spoken Japanese vowels", in Proc. Int. Conf. on Speech Process., Taejon, Korea, 2001, pp. 431-436.

G.E. Peterson, et al. "A physiological theory of phonetics", J. Speech Hear. Res. 9, 1966, pp. 5-67.

A. Iida, at al. "Acoustic nature and perceptual testing of corpora of emotional speech", in Proc. 5th Int. Conf. on Spoken Lang. Process., 1998, pp. 1559-1562.

P. Mokhtari, at al. "Automatic Detection of Acoustic Centres of Reliability for Tagging Paralinguistic Information in Expressive Speech", in Proc. 3rd Int. Conf. on Language Resources and Evaluation, Las Palmas, Canary Islands, Spain, 2002, pp. 2015-2018.

A. Bayya, et al. "Towards feature-based speech metric", in Proc. IEEE Int. Conf. on Acoust., Speech, and Sig. Process., 1990, pp. 781-784.

J. Högberg "Prediction of format frequencies from linear combinations of filterbank and cepstral coefficients", KTH-STL-QPSR, Royal Inst. Of Tech. Stockholm, Sweden, 1997, pp. 41-49.

W. A. Lea, et al. "Algorithms for acoustic prosodic analysis", in Pros, IEEE Int. Conf. on Acoust., Speech, and Sig. Process., 1984, 42.7.1-42.7.4.

P. Mokhtari, at al. "Perceptual validation of a voice quality parameter AQ automatically measured in acoustic islands of reliability", in Proc. Meeting of the Acoust. Soc. Of Japan, Kanagawa Univ., Japan, Paper 1-P-25, 2002a, pp. 401-402.

* cited by examiner

APPARATUS AND METHOD FOR EXTRACTING SYLLABIC NUCLEI

This application is the U.S. National Phase under 35 U.S.C. § 371 of International Application No. PCT/JP2003/001954, filed on Feb. 21, 2003, which in turn claims the benefit of Japanese Application No. 2002-141390, filed on May 16, 2002, the disclosures of which Applications are incorporated by reference herein.

TECHNICAL FIELD

The present invention generally relates to a technique for extracting a portion representing characteristics of the waveform from a speech waveform with high reliability, and more specifically, it relates to a technique for extracting an area, from the speech waveform, effective to estimate with high reliability a state of a source of the speech waveform.

BACKGROUND ART

First, words used in this section will be defined.

"Pressed sound" refers to a sound produced with one's glottis closed tight, so that the air does not smoothly flow through the glottis and the acceleration of the airflow passing through the glottis becomes large. Here, the glottal flow waveform is much deformed from a sine curve, and a gradient of its differential waveform locally becomes large. When a speech has such characteristics, the speech will be referred to as "pressed" speech.

"Breathy sound" refers to a sound produced with one's glottis opened and not tight, so that air flows smoothly and as a result, the glottal flow waveform becomes closer to a sine curve. Here, the gradient of the differential waveform of the glottal flow waveform does not locally become large. When a speech has such characteristics, the speech will be referred to as "breathy" sound.

"Modal" refers to a sound between the pressed and breathy sounds.

"AQ (Amplitude Quotient)" is a peak-to-peak amplitude of the glottal flow waveform divided by the amplitude of the minimum of the flow derivative.

Speech synthesis is as important a field of phonetic study as speech recognition. Recent development in signal processing technology promoted use of speech synthesis in many fields. Conventional speech synthesis is, however, simple production of speech from text information, and subtle emotional expression observed in human conversation cannot be expected.

By way of example, human conversation transmits information such as anger, joy and sadness through vocal sound and the like, other than the information of the speech contents. Information other than the language, accompanying the speech will be referred to as paralinguistic information. Such information cannot be represented with text information only. In the conventional speech synthesis, however, it has been difficult to transmit such paralinguistic information. For higher efficiency of man-machine interface, it is desirable to transmit not only the text information but also the paralinguistic information at the time of speech synthesis.

As a solution to this problem, continuous speech synthesis in various utterance styles has been proposed. A specific approach is as follows. Speeches are recorded and converted to data-processable form to prepare a database, and speech units in the database that are considered to express desired features (such as anger, joy, and sadness) are labeled correspondingly. At the time of speech synthesis, a speech having a label corresponding to the desired paralinguistic information is utilized.

However, the preparation of a database with sufficient coverage of speaking-styles necessarily implies processing of huge amounts of recorded speech. Therefore, automatic feature extraction and labeling without operator supervision must be ensured.

Examples of the paralinguistic information are as follows. One of the speaking styles is the discrimination between pressed sound and breathy sound. The pressed sound is produced rather strongly, because the glottis is tight. The breathy sound is not perceived as strong, because the voice has a near-sine curve. Accordingly, discrimination between pressed sound and breathy sound is a significant speaking style, and if represented in a numerical value, the degree thereof may possibly be utilized as paralinguistic information.

A great deal of research has been reported on the acoustic cues, which differentiate breathiness from pressed voice-quality. See, for example, 'The science of the singing voice,' Sundberg, J., Northern Illinois University Press, Delcalb, Ill., (1987)(hereafter 'Soundberg'). The majority of such studies, however, have been limited to speech (or singing) data recorded during sustained phonation of steady-state vowels. It indeed remains a challenge to quantify with high reliability the degree of pressedness or breathiness, from acoustic measurements in large amounts of recorded speech data, and if realized, this would be very helpful.

While various measures have been proposed which approximate properties of the voice-source in the spectral domain, the most direct estimates are obtained from a combination of the glottal-flow waveform and its derivative. An example of such approximation is AQ proposed in Reference 2 listed on the last part of the specification.

One advantage of AQ is explained in 'Amplitude domain quotient for characterization of the glottal volume velocity waveform estimated by inverse filtering', Alku, P. & Vilkman, E., Speech Comm., 18(2), 131-138, (1996)(hereafter 'Alku'). In Alku, it is explained that one advantage of AQ is its relative independence of the sound pressure level (SPL) and its reliance primarily on phonatory quality. Another possible advantage is that it is a purely amplitude-domain parameter and should therefore be relatively immune to the sources of error in measuring time-domain features of the estimated glottal waveform. Alku have found that for all of four male and four female speakers producing the sustained vowel "a" with a range of phonation types, the value of AQ decreased monotonically when phonation was changed from breathy to pressed (See Alku, p. 136). AQ seems therefore promising in our efforts to solve the problem discussed in the foregoing. It is noted, however, that the following conditions must be satisfied, to have AQs effectively applied:

1) AQs can be measured robustly and reliably in recorded natural speech; and

2) Perceptual salience of the parameter as measured under such conditions can be validated.

To satisfy such conditions, it is of importance how to reliably extract, from speech waveforms representative of physical quantities, such as naturally produced voices, parameters representative of features of the speech waveforms. Particularly, speeches may have portions that are reliable and not reliable to extract parameters, when the utterances are not fully and closely controlled by the speaker or when various speakers give utterances in various styles. Therefore, it is important to choose which portion of the speech waveform as the object of processing. To this end, a central portion of a syllable (tentatively referred to as "syllabic nuclei") must correctly be extracted where a syllable serves as a unit of sound production, as in the case of Japanese.

DISCLOSURE OF THE INVENTION

Therefore, an object of the present invention is to enable automatic determination of a portion that reliably represents a feature of a speech waveform. Another object of the present invention is to enable determination of a portion that reliably represents a feature of a speech waveform without operator supervision. A further object of the present invention is to enable reliable automatic extraction of syllabic nuclei.

A first aspect of the present invention relates to an apparatus for determining a portion reliably representing a feature of a speech waveform, based on speech waveform data representing physical quantities, which can be divided into a plurality of syllables, as well as to a program causing a computer to operate as such an apparatus. The apparatus includes: an extracting means for calculating, from the data, distribution of an energy of a prescribed frequency range of the speech waveform on a time axis, and for extracting, among various syllables of the speech waveform, a range that is generated stably by a source of the speech waveform, based on the distribution and pitch of said speech waveform; an estimating means for calculating, from the data, distribution of spectrum of the speech waveform on the time axis, and for estimating, based on the spectral distribution on the time axis, a range of the speech waveform of which change is well controlled by the source; and a means for determining that range which is extracted by the extracting means as the range generated stably by the source and of which speech waveform is estimated by the estimating means to be well controlled by the source, as a highly reliable portion of the speech waveform.

As the highly reliable portion of the speech waveform is determined based both on the result of extraction by the extracting means and on the result of estimation by the estimating means, the determined result is highly robust.

The extracting means may include: a voiced/unvoiced determining means for determining, based on the data, whether each segment of the speech waveform is voiced or unvoiced; a means for separating the speech waveform into syllables at a local minimum of the waveform of energy distribution of the prescribed frequency range of the speech waveform on the time axis; and a means for extracting that range of the speech waveform which includes, in each syllable, an energy peak in that syllable within the segment determined to be a voiced segment by the voiced/unvoiced determining means and in which the energy of the prescribed frequency range is not lower than a prescribed threshold value.

In a segment that is determined to be a voiced segment, a range of which energy of the prescribed frequency range is not lower than the prescribed threshold value is extracted. Therefore, a segment that is produced stably by the speaker can reliably be extracted.

Preferably, the estimating means includes: a linear predicting means for performing linear prediction analysis on the speech waveform and outputting an estimated value of formant frequency; a first calculating means for calculating, using the data, distribution of non-reliability of the estimated value of formant frequency provided by the linear predicting means on the time axis; a second calculating means for calculating, based on an output from the linear predicting means, distribution on the time axis of local variance of spectral change on the time axis of the speech waveform; and means for estimating, based both on the distribution on the time axis of non-reliability of the estimated value of formant frequency calculated by the first calculating means and on the distribution on the time axis of local variance of spectral change in the speech waveform calculated by the second calculating means, a range in which change in the speech waveform is well controlled by the source.

A range in which the change in speech waveform is well controlled by the source is estimated based both on the non-reliability of estimated value of formant frequency and on the local variance of spectral change on the time axis of the speech waveform. As the range in which vibration is controlled with clear intent by the source of vibration (for example, the speaker) is estimated, and if the feature of vibration is calculated from such a range, the calculated feature is expected to have high reliability.

The determining means may include a means for determining, as a highly reliable portion of the speech waveform, a range included in the range extracted by the extracting means, within the range of which change in speech waveform is estimated by the estimating means to be well controlled by the source.

Among the ranges of which change in speech waveform is estimated to be well controlled by the source, only the range in which the speech waveform is stably generated by the source is determined to be the highly reliable portion. Therefore, only the truly reliable portion can be extracted.

According to another aspect, the present invention relates to a quasi-syllabic nuclei extracting apparatus for separating speech signal into quasi-syllables and extracting a nuclear portion of each quasi-syllable, and to a program causing a computer to operate as such an apparatus. The quasi-syllabic nuclei extracting apparatus includes: a voiced/unvoiced determining means for determining whether each segment of the speech signal is voiced or unvoiced; a means for separating the speech signal into quasi-syllables at a local minimum of time-distribution waveform of an energy of a prescribed frequency range of the speech signal; and a means for extracting that range of the speech signal which includes energy peak in each quasi-syllable, determined by the voiced/unvoiced determining means to be a voiced segment and of which energy of the prescribed frequency range is not lower than a prescribed threshold value, as the nuclei of quasi-syllable.

A range in the segment determined to be a voiced segment and having the energy in the prescribed frequency range not lower than a prescribed threshold value is extracted as the nuclei of the quasi syllable, so that the voice stably produced by the speaker can be extracted.

According to a still further aspect, the present invention relates to an apparatus for determining a portion representing, with high reliability, a feature of a speech signal, and to a program causing a computer to operate as such an apparatus. The apparatus includes a linear predicting means for performing linear prediction analysis on the speech signal; a first calculating means for calculating, based on an estimated value of formant provided by the linear predicting means and on the speech signal, distribution on time axis of non-reliability of the formant estimated value; a second calculating means for calculating, based on the result of linear prediction analysis by the linear predicting means, distribution on time axis of local variance of spectral change in the speech signal; and a means for estimating, based on the distribution on time axis of the non-reliability of the estimated value of formant frequency calculated by the first calculating means, and on the distribution on time axis of local variance of spectral change in the speech waveform calculated by the second calculating means, a range in which the change in speech waveform is well controlled by the source.

Both the distribution on time axis of the non-reliability of formant estimated value and the distribution on time axis of local variance of spectral change in the speech signal represent, at their local minima, portions of which generation of speech waveform is well controlled by the source, among the speech signals. As the range is estimated using these two pieces of information, the portion at which generation of speech waveform is well controlled can be identified with high reliability.

BEST MODES FOR CARRYING OUT THE INVENTION

Embodiments of the present invention that will be described in the following are implemented by a computer and software running on the computer. It is needless to say that part of or all of the functions described below may be implemented by hardware, rather than the software.

Words used in the description of the embodiments will be defined.

A "pseudo-syllable" refers to a bounded segment of a signal determined by a prescribed signal processing of the speech signal, which may correspond to a syllable or syllables in the case of Japanese speech.

"Sonorant energy" refers to an energy of a prescribed frequency (for example, frequency range of 60 Hz to 3 kHz) of the speech signal, represented in decibels.

"Center of reliability" refers to a range that comes to be regarded as a portion of the speech waveform, from which the feature of the object waveform can be extracted with high reliability, as a result of signal processing of the speech waveform.

A "dip" refers to a constricted portion of a graph or figure. Particularly, a dip refers to a portion that corresponds to a local minima of a waveform formed by a distribution on a time axis of values that vary as a function of time.

"Unreliability" is a measure representing lack of reliability. Unreliability is a concept opposite to reliability.

Figure 1:
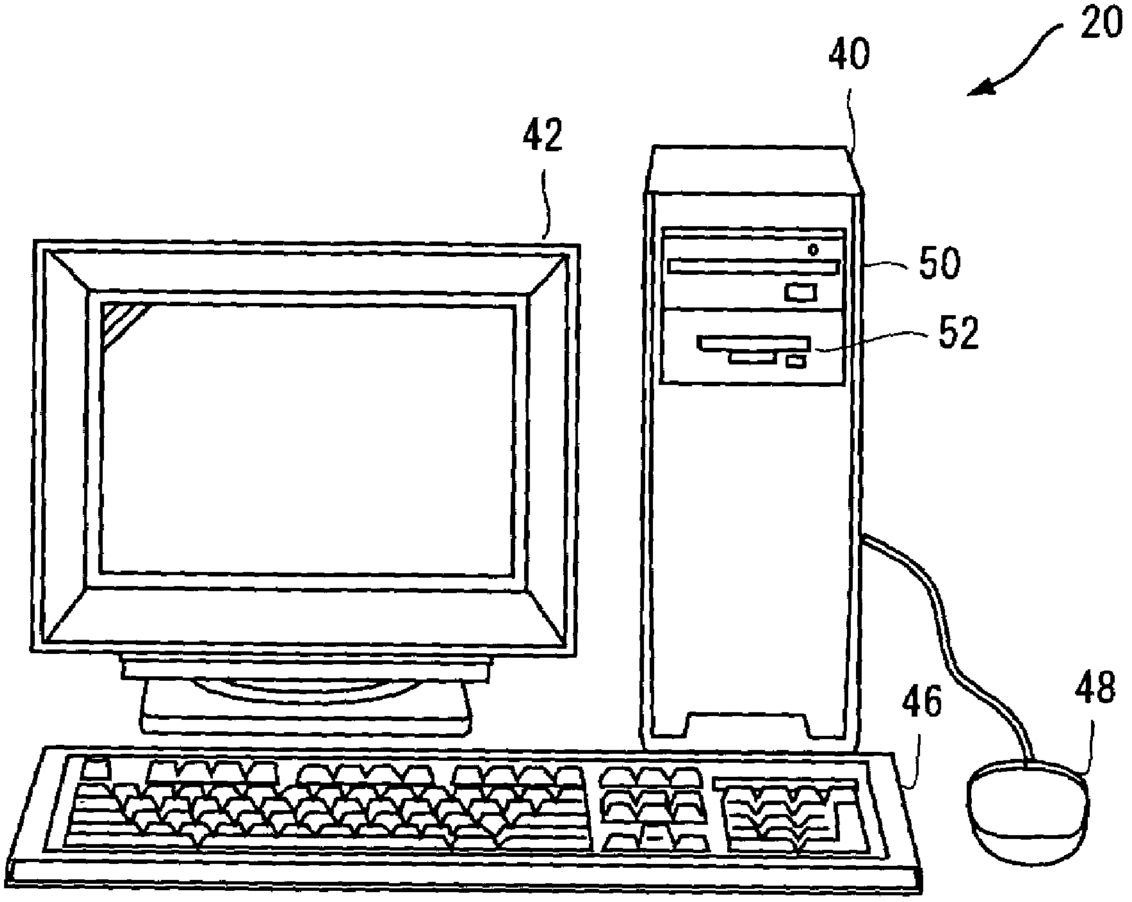
FIG. 1 shows an appearance of a computer system executing a program in accordance with an embodiment of the present invention.
Figure 2:
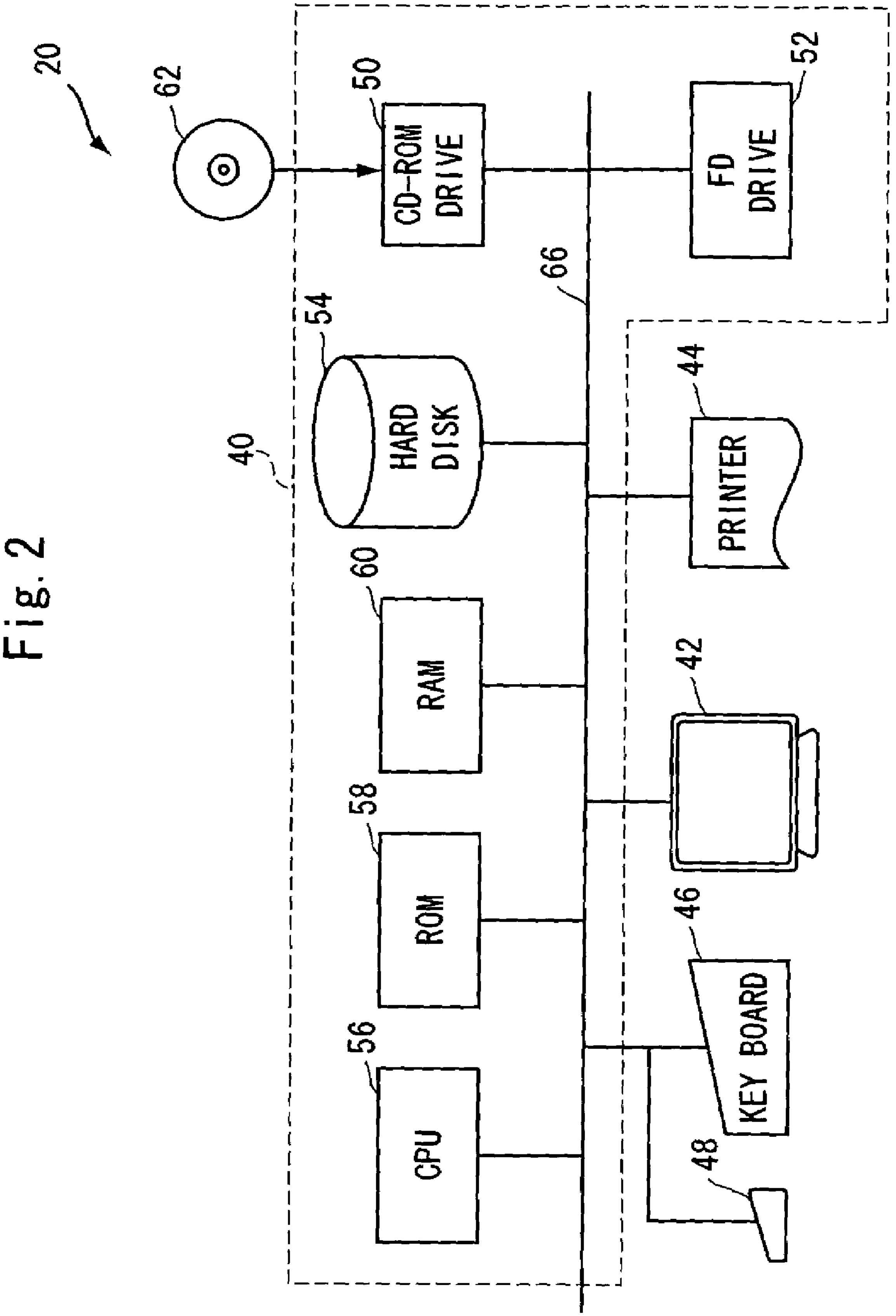
FIG. 2 is a block diagram of the computer system shown in FIG. 1.

FIG. 1 shows an appearance of a computer system 20 used in the present embodiment, and FIG. 2 is a block diagram of computer system 20. It is noted that computer system 20 shown here is only an example and various other configurations are available.

Referring to FIG. 1, computer system 20 includes a computer 40, and a monitor 42, a keyboard 46, and a mouse 48 that are all connected to computer 40. Further, computer 40 has a CD-ROM (Compact Disc Read-Only Memory) drive 50 and an FD (Flexible Disk) drive 52 provided therein.

Referring to FIG. 2, computer system 20 further includes a printer 44 connected to computer 40, which is not shown in FIG. 1. Computer 40 further includes a bus 66 connected to CD-ROM drive 50 and FD drive 52, and a CPU (Central Processing Unit) 56, an ROM (Read-Only Memory) 58 storing a boot-up program of the computer and the like, an RAM (Random Access Memory) 60 providing a work area used by CPU 56 and a storage area for a program executed by CPU 56, and a hard disk 54 storing the speech database, which will be described later, all connected to bus 66.

The software that implements the system of the embodiment described in the following is distributed recorded on a recording medium such as a CD-ROM 62, read to computer 40 through a reading device such as CD-ROM drive 50, and stored in hard disk 54. When CPU 56 executes the program, the program is read from hard disk 54 and stored in RAM 60, an instruction is read from an address designated by a program counter, not shown, and the instruction is executed. CPU 56 reads the data as the object of processing from hard disk 54, and stores the result of processing also in hard disk 54.

As the operation of computer system 20 itself is well-known, detailed description will not be given here.

As to the manner of software distribution, it may not necessarily be fixed on a recording medium. By way of example, the software may be distributed from another computer connected through a network, from which data is received. A part of the software may be stored in hard disk 54, and the remaining part of the software may be taken through a network to hard disk 54 and integrated at the time of execution.

Typically, a modern computer utilizes general functions provided by the operating system (OS) of the computer, and executes the functions in an organized manner in accordance with a desired object, to attain the object. Therefore, it is obvious that a program or programs not including the general function provided by the OS or by a third party and designating only a combination of execution orders of the general functions fall within the scope of the present invention, as long as the program or programs have the control structure that, as a whole, attains the desired object using such combination.

Figure 3:
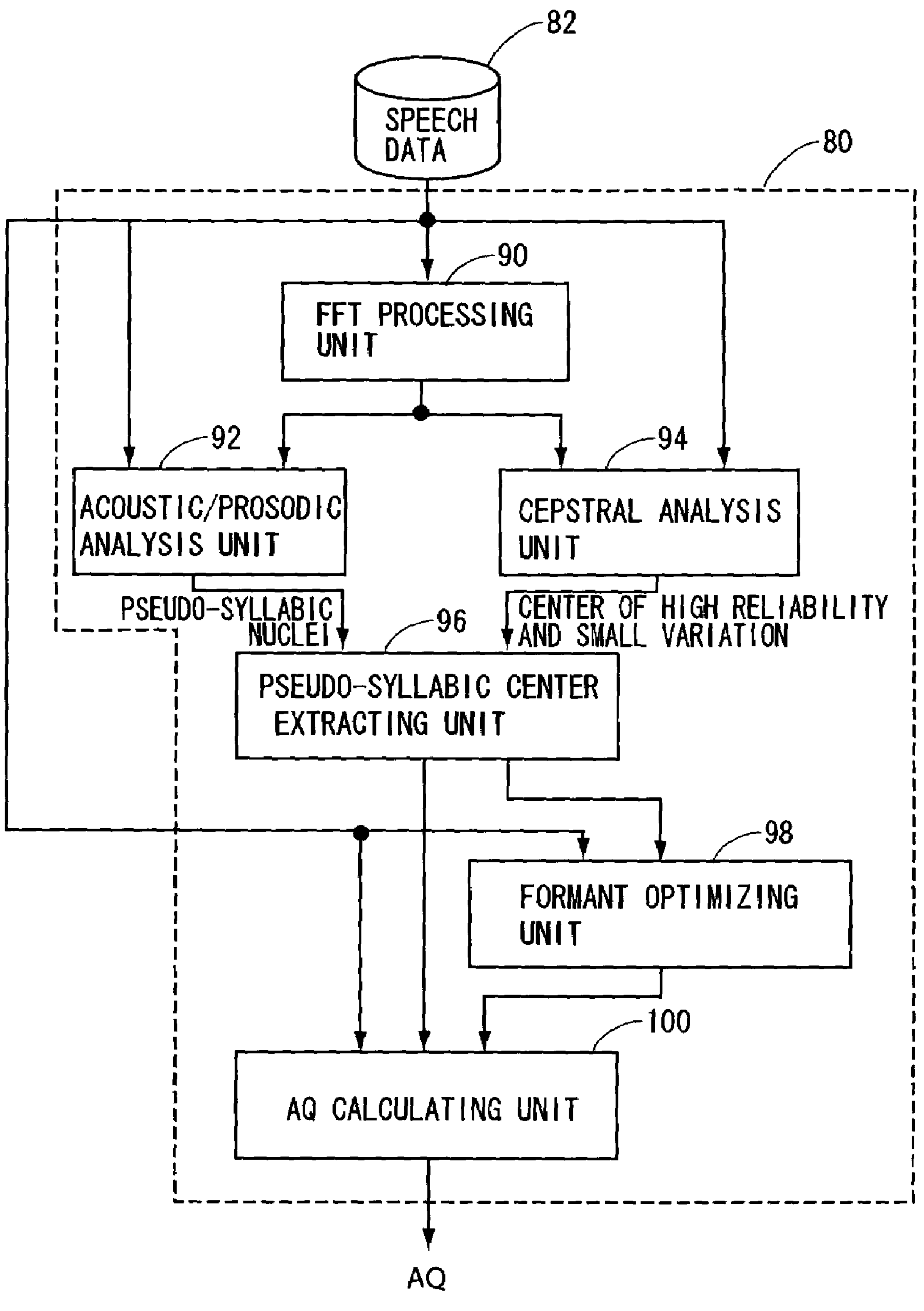
FIG. 3 is a block diagram representing an overall configuration of the program in accordance with an embodiment of the present invention.

The block diagrams of FIG. 3 and the following figures represent the program of the present embodiment as an apparatus. Referring to FIG. 3, the apparatus 80 performs the following processes on speech data 82 stored in hard disk 54, to calculate and output AQ described above, for each process unit (by way of example, for each syllable), included in the speech data. As will be described later, the speech data is divided in advance into frames, each of 32 msec.

Apparatus 80 includes an FFT processing unit 90 performing Fast Fourier Transform (FFT) on the speech data; an acoustic/prosodic analysis unit 92 using an output from FFT processing unit 90, for extracting a range that is produced stably (hereinafter referred to as "pseudo-syllabic nuclei") by the vocal apparatus of a speaker from various syllables of the speech waveform given by the speech data, based on time-change in energy in the frequency range of 60 Hz to 3 kHz of the speech waveform given by the speech data and on the change in speech pitch; and a cepstral analysis unit 94 performing cepstral analysis on speech data 82 and estimating a portion that has small variation in speech spectrum and from which the feature of speech data is believed to be extracted with high reliability (hereinafter this portion will be referred to as a "center of a portion of high reliability and small variation", a "center of high reliability and small variation" or simply as a "center of reliability"), as a result of cepstral analysis using an output from FFT processing unit 90.

Apparatus 80 further includes: a pseudo-syllabic center extracting unit 96 extracting, as a pseudo-syllabic center, only that one of the centers of portions of high reliability and small variation output from cepstral analysis unit 94 which is in the pseudo-syllabic nuclei output from acoustic/prosodic analysis unit 92; a formant optimizing unit 98 performing initial estimation and optimization of formant on the speech data corresponding to the pseudo-syllabic center extracted by pseudo-syllabic center extracting unit 96, for outputting a final estimation of formant; and an AQ calculating unit 100 estimating a derivative of the glottal flow waveform by performing a signal processing such as adaptive filtering using the formant value output from formant optimizing unit 98, estimating the glottal flow waveform by integrating the resulting estimation, and calculating AQ therefrom.

Figure 4:
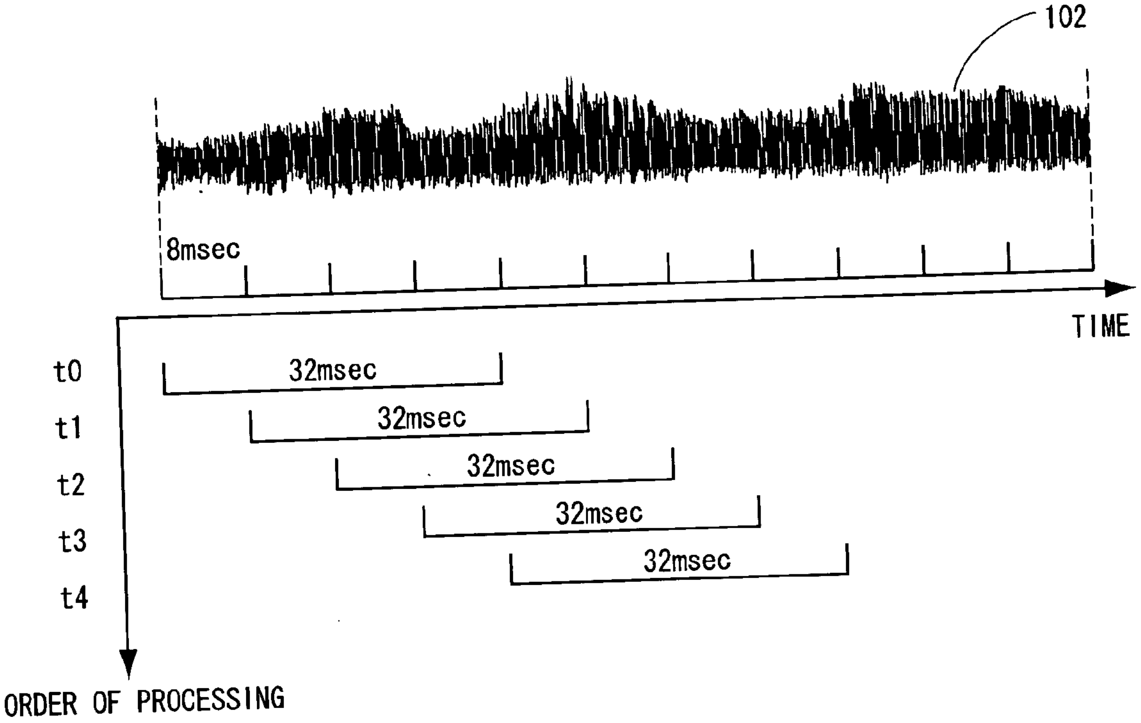
FIG. 4 schematically shows speech data.

FIG. 4 schematically shows the speech data. Referring to FIG. 4, a speech data waveform 102 is divided into frames each of 32 msec and shifted by 8 msec from proceeding and succeeding frames, and digitized. The process described in the following proceeds such that at a time point t0, process starts from the first frame as a head frame, and at a next time point t1, the process starts from the next, second frame as a head frame, which is delayed by 8 msec.

Figure 5:
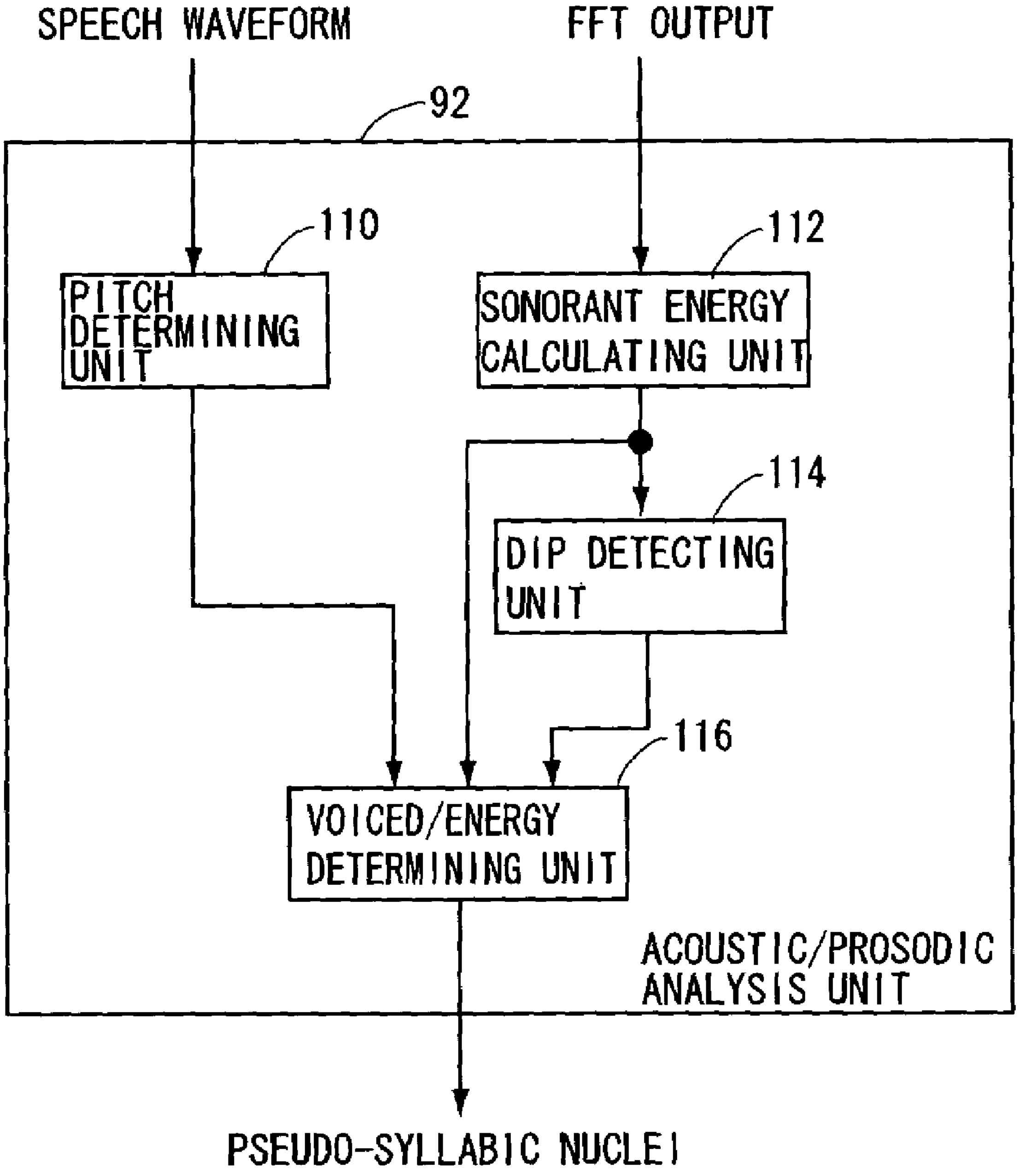
FIG. 5 is a block diagram of an acoustic/prosodic analysis unit 92 shown in FIG. 3.

FIG. 5 is a block diagram of acoustic/prosodic analysis unit 92 shown in FIG. 3. Referring to FIG. 5, acoustic/prosodic analysis unit 92 includes: a pitch determining unit 110 for determining whether an object frame is a voiced or unvoiced segment, using the pitch of the source measured from the speech waveform (as to the method of determination, see Reference 3); a sonorant energy calculating unit 112 for calculating waveform distribution of sonorant energy in a prescribed frequency range (60 Hz to 3 kHz) on a time axis, based on the output from FFT processing unit 90; a dip detecting unit 114 for applying convex-hull algorithm on a contour of distribution waveform of the sonorant energy on the time axis calculated by sonorant energy calculating unit 112, and for detecting a dip of the contour of distribution waveform of the sonorant energy on time axis, so as to divide the input speech into pseudo-syllables (as to the specific method, see References 4 and 5); and a voiced/energy determining unit 116 for locating a point attaining maximum sonorant energy (SE peak) and for expanding, one by one, frames on left and right sides of the peak which have the sonorant energy higher than a prescribed threshold value (0.8×SE peak) and which is determined by pitch determining unit 110 to be the voiced segments, belonging to the same pseudo-syllable, to output the pseudo-syllabic nuclei.

Figure 6:
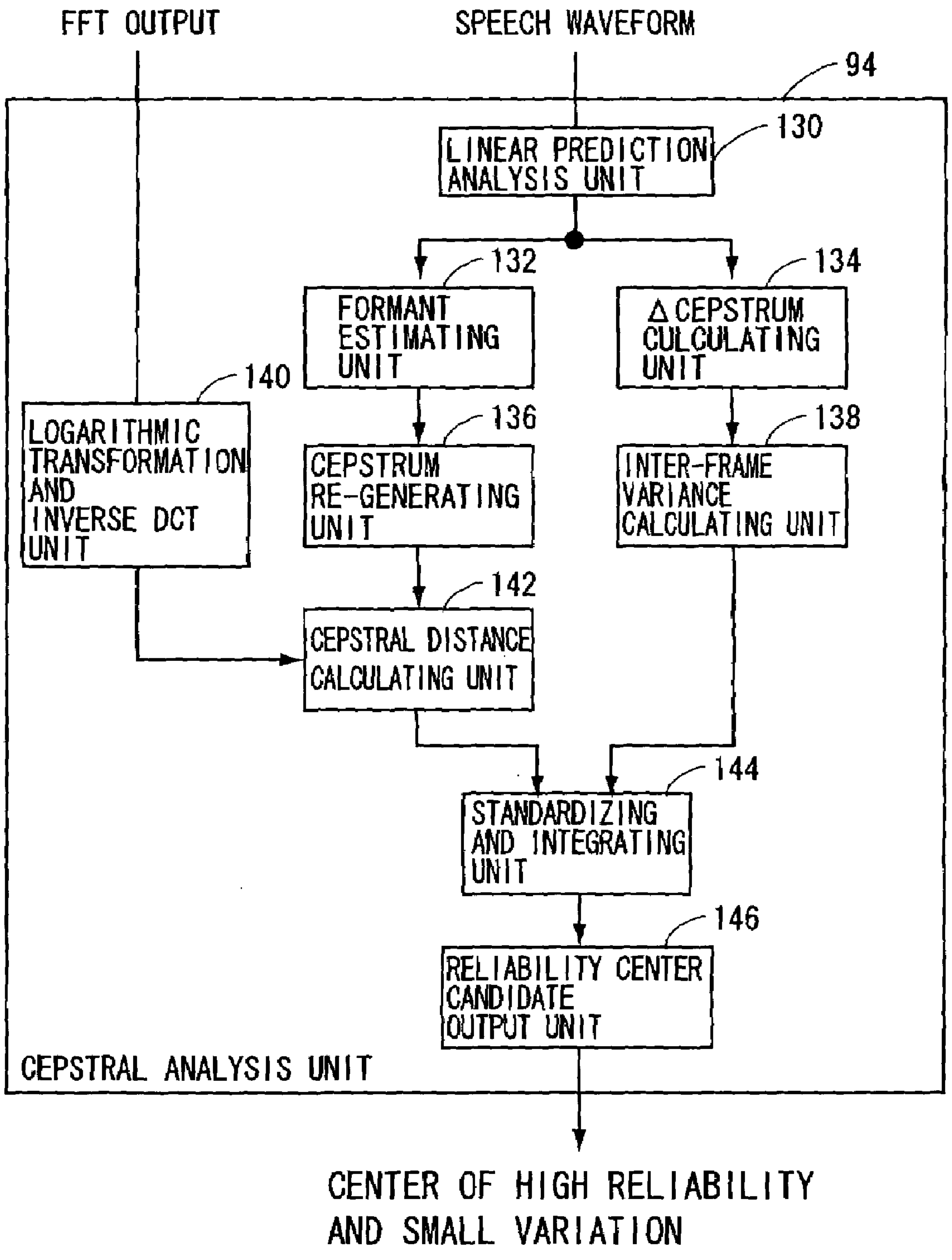
FIG. 6 is a block diagram of a cepstral analysis unit 94 shown in FIG. 3.

FIG. 6 is a block diagram of cepstral analysis unit 94 shown in FIG. 3. Referring to FIG. 6, cepstral analysis unit 94 includes a linear prediction analysis unit 130 for performing selective linear prediction (SLP) analysis on the speech waveform of speech data 82 and for outputting SLP cepstral coefficients $c_{f,i}$; and a formant estimating unit 132 for calculating initial estimations of frequency and bandwidth of first four formants based on the cepstral coefficients. Formant estimating unit 132 has learned mapping for a vowel formant measured carefully using the same data subset, and utilizing the linear cepstrum-formant mapping proposed in Reference 6. For this learning, see Reference 7.

Cepstral analysis unit 94 further includes a cepstrum re-generating unit 136 for re-calculating cepstral coefficients $C_i^{smip}$ based on the estimated formant frequency and the like; a logarithmic transformation and inverse discrete cosine transformation unit 140 for performing logarithmic transformation and inverse discrete cosine transformation on the output of FFT processing unit 90 and for calculating FFT cepstral coefficients; and a cepstral distance calculating unit 142 calculating a cepstral distance $d_f^2$ defined by the following equation, representing differences between cepstral coefficients $C_i^{smip}$ calculated by cepstrum re-generating unit 136 and FFT cepstral coefficients $C_i^{FFT}$ calculated by logarithmic transformation and inverse discrete cosine transformation unit 140 and outputting the same as an index representing unreliability of the value of formant frequency estimated by formant estimating unit 132:

$$d_f^2=\mathrm{Sum}_i\{i^2\cdot(c_i^{simp}-c_i^{FFT})^2\} \tag{1}$$

Formant estimating unit 132, cepstrum re-generating unit 136, cepstral distance calculating unit 142 and logarithmic transformation and inverse discrete cosine transformation unit 140 calculate unreliability of values such as the formant frequency estimated based on the result of linear prediction analysis.

Cepstral analysis unit 94 further includes: a Δ cepstrum calculating unit 134 for calculating Δ cepstrum from the cepstral coefficients output from linear prediction analysis unit 130; and an inter-frame variance calculating unit 138 calculating, for every frame, variance in magnitude of spectral change among five frames including the frame of interest. An output of inter-frame variance calculating unit 138 represents a contour of distribution waveform on the time axis of local spectral movement, of which local minimum is considered to represent controlled movement (CM) in accordance with the theory of articulatory phonetics proposed in Reference 8.

Cepstral analysis unit 94 further includes: a standardizing and integrating unit 144 for receiving the value representative of unreliability of estimated formant frequency output from cepstral distance calculating unit 142 and a local inter-frame variance output from inter-frame variance calculating unit 138, and for standardizing and integrating these values to output the result as a distribution waveform on time axis of the value representing the unreliability of speech signal frame by frame; and a reliability center candidate output unit 146 for detecting a dip in a waveform contour formed by the distribution waveform on the time axis of the unreliability value output by standardizing and integrating unit 144 using convex-hull algorithm, and outputting the same as a reliability center candidate.

Figure 7:
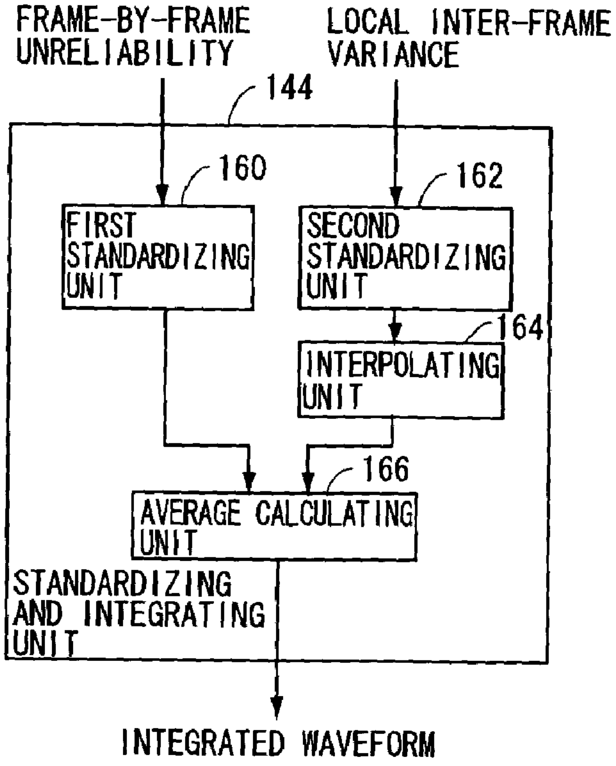
FIG. 7 is a block diagram of a standardizing and integrating unit 144 shown in FIG. 6.

FIG. 7 is a block diagram of standardizing and integrating unit 144 shown in FIG. 6. Referring to FIG. 7, standardizing and integrating unit 144 includes: a first standardizing unit 160 for standardizing the cepstral distance output from cepstral distance calculating unit 142 to the values in [0, 1]; a second standardizing unit 162 for standardizing the inter-frame variance calculated for each frame by inter-frame variance calculating unit 138 to the values in [0, 1]; an interpolating unit 164 for performing linear interpolating process such that the positions on time axis of local inter-frame variances match sampling timings of cepstral distance output from cepstral distance calculating unit 142; and an average calculating unit 166 outputting an average of the outputs from first standardizing units 160 and interpolating unit 164 frame by frame. An output of average calculating unit 166 represents a contour of distribution waveform on the time axis of the integrated value. By detecting a dip (local minimum) of the waveform contour by reliability center candidate output unit 146, the portion of lowest unreliability (highest reliability) can be specified as the candidate of reliability center.

Figure 8:
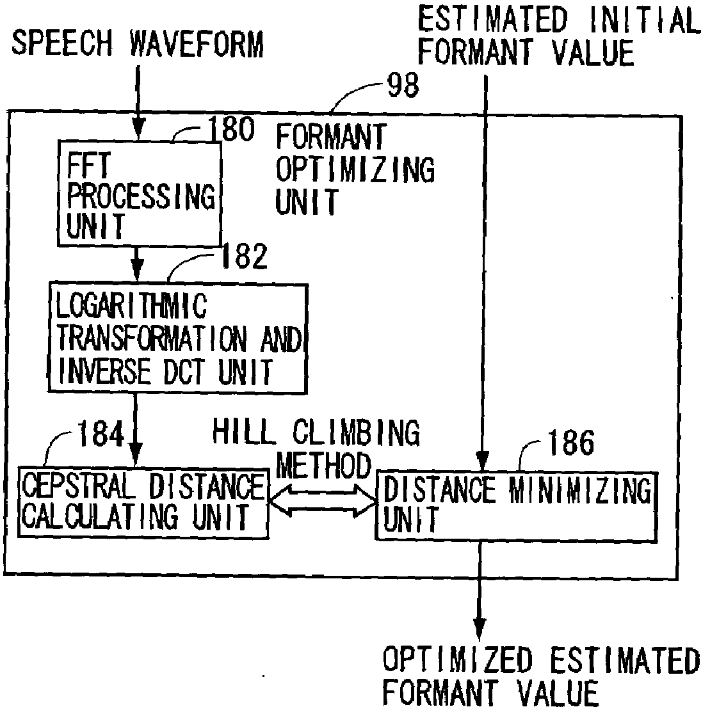
FIG. 8 is a block diagram of a formant optimizing unit 98 shown in FIG. 3.

FIG. 8 is a block diagram of formant optimizing unit 98 shown in FIG. 3. Referring to FIG. 8, formant optimizing unit 98 includes: an FFT processing unit 180 for performing FFT on the speech waveform; a logarithmic transformation and inverse DCT unit 182 for performing logarithmic transformation and inverse discrete cosine transformation on the output of FFT processing unit 180; a cepstral distance calculating unit 184 calculating a cepstral distance between the FFT cepstral coefficients output from logarithmic transformation and inverse DCT unit 182 and an estimated formant value as will be described later; and a distance minimizing unit 186 for optimizing the estimated formant value by hill-climbing method such that the distance calculated by cepstral distance calculating unit 184 is minimized, using initial estimates of first to fourth formant frequencies in each of the reliability center candidates as initial values. The estimated formant value optimized by distance minimizing unit 186 is applied to AQ calculating unit 100 as an output of formant optimizing unit 98.

Figure 9:
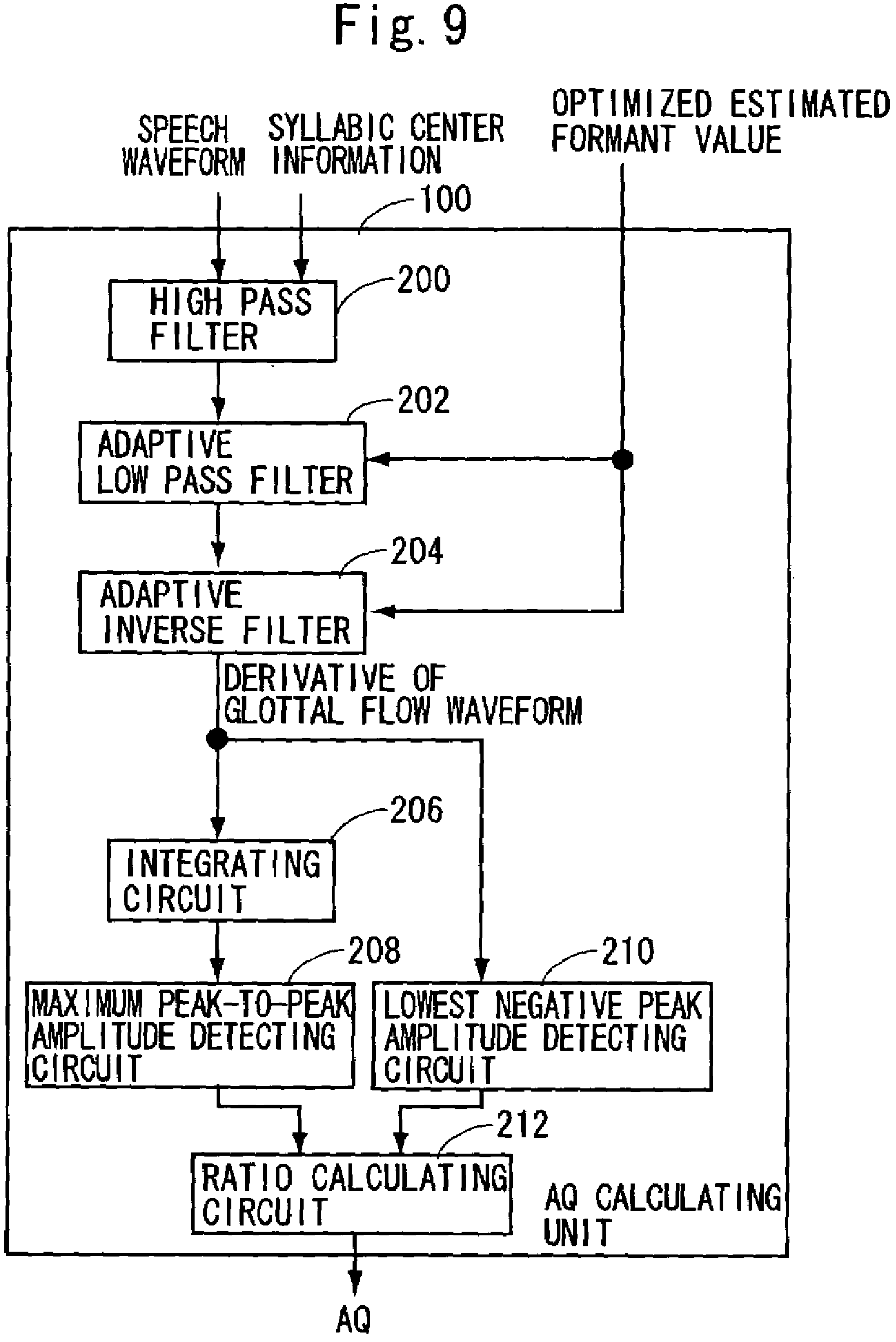
FIG. 9 is a block diagram of an AQ calculating unit 100.

Referring to FIG. 9, AQ calculating unit 100 includes: a high pass filter 200 selectively passing only the frequency component of 70 Hz or higher, of the 64 msec portion at a position corresponding to the syllabic center of the speech signal; an adaptive low pass filter 202 selectively passing only the frequency component that is not higher than the sum of optimized fourth formant frequency and its bandwidth, from the outputs of high pass filter 200; and an adaptive inverse filter 204 for performing adaptive inverse filtering using first to fourth formant frequencies on the outputs of adaptive low pass filter 202. The output of adaptive inverse filter 204 will be the derivative waveform of the glottal flow waveform.

AQ calculating unit 100 further includes: an integrating circuit 206 integrating the outputs of adaptive inverse filter 204 and outputting the glottal flow waveform; a maximum peak-to-peak amplitude detecting circuit 208 for detecting maximum peak-to-peak amplitude of the output of integrating circuit 206; a lowest negative peak amplitude detecting circuit 210 for detecting maximum amplitude of a negative peak of the output of adaptive inverse filter 204; and a ratio calculating circuit 212 for calculating a ratio of the output of maximum peak-to-peak amplitude detecting circuit 208 to the output of lowest negative peak amplitude detecting circuit 210. The output of ratio calculating circuit 212 is AQ.

The apparatus described above operates in the following manner. First, the used speech data 82 will be described. The speech data is the one used in Reference 9, which was prepared by recording three stories read by a female, native speaker of Japanese. These stories were prepared to evoke the emotions of anger, joy and sadness. Each story contained more than 400 sentence-length utterances (or more than 30,000 phonemes). These utterances are stored in separate speech-wave files for independent processing.

Each sentence-length utterance data is subjected to FFT processing by FFT processing unit 90, and thereafter, subjected to the following processes, which proceed along two main strands. One is acoustic-prosodic processing performed by acoustic/prosodic analysis unit 92, and the other is acoustic-phonetic processing performed by cepstral analysis unit 94.

In the acoustic-prosodic strand, sonorant energy in the frequency range of 60 Hz to 3 kHz is calculated by sonorant energy calculating unit 112 shown in FIG. 5. From the contour of the entire waveform of utterance data of one sentence output from sonorant energy calculating unit 112, dip detecting unit 114 detects a dip, by applying convex-hull algorithm. By the dip, quasi-syllabic segmentation of the utterance is obtained.

The voiced/energy determining unit 116 finds a point (SEpeak) having the maximum sonorant energy among the quasi-syllables. This point is the initial point of the quasi-syllabic nuclei. Further, voiced/energy determining unit 116 extends, starting from the initial point and frame by frame both to the left and to the right, the range of the quasi-syllabic nuclei, until a frame of which sonorant energy is not higher than 0.8×SEpeak, a frame determined by pitch determining unit 110 to be not voiced, or a frame out of the quasi-syllabic nuclei is encountered. In this manner, the boundaries of quasi-syllabic nuclei area determined, of which information is applied to pseudo-syllabic center extracting unit 96. Though the value 0.8 is used here as the threshold, it is a mere example, and the value must be changed appropriately dependent on application.

Referring to FIG. 6, for one input utterance, linear prediction analysis unit 130 performs linear prediction analysis, and outputs SLP cepstral coefficients. Based on the SLP cepstral coefficients, Δ cepstrum calculating unit 134 calculate Δ cepstrum, which is applied to inter-frame variance calculating unit 138. Based on Δ cepstral coefficients, inter-frame variance calculating unit 138 calculates variance of local spectral variation in five frames including the frame of interest, for each frame. It is considered that the smaller the variance, the better controlled the utterance by the speaker, and the larger the variance, the poorer controlled the utterance by the speaker. Therefore, the output of inter-frame variance calculating unit 138 is believed to represent the degree how unreliable the utterance by the speaker is (represents unreliability).

Further referring to FIG. 6, formant estimating unit 132 estimates frequencies and bandwidths of the first to fourth formants, based on the SLP cepstral coefficients, using linear cepstral formant mapping.

Cepstrum re-generating unit 136 calculates the cepstral coefficients in an inverse manner based on the first to fourth formants estimated by formant estimating unit 132, and applies the same to cepstral distance calculating unit 142. Logarithmic transformation and inverse discrete cosine transformation unit 140 performs logarithmic transformation and inverse discrete cosine transformation on the original speech data of the same frame as that processed by formant estimating unit 132 and cepstrum re-generating unit 136 to obtain FFT cepstral coefficients, which is applied to cepstral distance calculating unit 142. Cepstral distance calculating unit 142 calculates the distance between the cepstral coefficients from cepstrum re-generating unit 136 and the cepstral coefficients from logarithmic transformation and inverse discrete cosine transformation unit 140 in accordance with equation (1) above. The result is considered to be a waveform representing a distribution on time axis of values indicating unreliability of the formant estimated by formant estimating unit 132. Cepstral distance calculating unit 142 applies the result to standardizing and integrating unit 144.

Referring to FIG. 7, a first standardizing unit 160 of standardizing and integrating unit 144 normalizes the value of unreliability of each frame calculated from the estimated formant value output from cepstral distance calculating unit 142 within the range of [0, 1], and applies the result to an average calculating unit 166. A second standardizing unit 162 normalizes the value of local inter-frame variance calculated frame by frame and output by inter-frame variance calculating unit 138 shown in FIG. 6 within the range of [0, 1], and applies the result to interpolating unit 164. Interpolating unit 164 performs linear interpolation on each value from second standardizing unit 162 to obtain a value that corresponds to the sampling point of each frame output from first standardizing unit 160, and applies the result to average calculating unit 166. Average calculating unit 166 normalizes the outputs from the first standardizing unit 160 and of interpolating unit 164 frame by frame, and outputs the result to reliability center candidate output unit 146 as an integrated waveform representing the distribution of unreliability on the time axis.

Reliability center candidate output unit 146 detects the dip of the contour of integrated waveform output from standardizing and integrating unit 144 in accordance with convex-hull algorithm, and outputs information specifying the frame as the candidate of reliability center, to a pseudo-syllabic center extracting unit 96 shown in FIG. 3.

Pseudo-syllabic center extracting unit 96 shown in FIG. 3 extracts, from the centers of reliability applied from reliability center candidate output unit 146 shown in FIG. 6, only those that are among the pseudo-syllabic nuclei applied from acoustic/prosodic analysis unit 92.

Through the processes described above, now we have obtained the information of the speech data that extracts feature of speech data, or represents a range having high reliability and small variation suitable for labeling speech data. Therefore, a desired processing may be performed on the frame specified by the information. In the apparatus in accordance with the present embodiment, pseudo-syllabic center extracting unit 96 applies this information to formant optimizing unit 98, and formant optimizing unit 98 optimizes the estimated formant value in the following manner, using this information.

In the apparatus of the present embodiment, the length of pseudo-syllabic center is determined to be five successive frames. Duration of one frame is 32 msec, and successive frames are delayed by 8 msec from each other, and therefore, duration of five frames in total corresponds to a speech period of 64 msec.

AQ at each of these quasi-syllabic center can be calculated directly from the glottal flow waveform obtained by AQ calculating unit 100 shown in FIG. 9. The estimate of glottal flow itself is influenced by the vocal tract resonance that corresponds to the original formant, and therefore, reliability thereof depends on whether the influence of resonance can be removed from the data of 64 msec of speech waveform. Therefore, AQ obtained through such calculation is unreliable.

Specifically, referring to FIG. 8, FFT processing unit 180 performs FFT processing on every frame of the speech waveform. Logarithmic transformation and inverse DCT unit 182 performs logarithmic transformation and inverse discrete cosine transform on the output of FFT processing unit 180. Cepstral distance calculating unit 184 calculates distance between the cepstral coefficients output from logarithmic transformation and inverse DCT unit 182 and estimated cepstral coefficients applied from distance minimizing unit 186. Distance minimizing unit 186 further optimizes the value of cepstral coefficients applied from distance minimizing unit 186 such that the distance calculated by cepstral distance calculating unit 184 is minimized, in accordance with the hill-climbing method, starting from the value of the cepstral coefficients indicating the estimated formant value, and outputs the estimated formant value at which the minimum value is attained.

Internal configuration of AQ calculating unit 100 is shown in FIG. 9. Referring to FIG. 9, the speech data of the quasi-syllabic center is first passed through high-pass filter 200, and as a result, noise as low as 70 Hz or lower is removed. Thereafter, by adaptive low pass filter 202, spectral information of a frequency range higher than the fourth formant is removed. Then, by adaptive inverse filter 204, influence of first to fourth formants is removed.

As a result, the output of adaptive inverse filter 204 becomes a good estimated derivative of the glottal flow waveform. By integrating this output by integrating circuit 206, an estimated value of glottal flow waveform can be obtained. Maximum peak-to-peak amplitude detecting circuit 208 detects the maximum peak-to-peak amplitude of the glottal flow. Lowest negative peak amplitude detecting circuit 210 detects maximum negative amplitude within the cycle of derivative waveform of the glottal flow. The ratio of the output of maximum peak-to-peak amplitude detecting circuit 208 to the output of lowest negative peak amplitude detecting circuit 210 is calculated by ratio calculating circuit 212, whereby AQ at the quasi-syllabic center can be obtained.

AQ obtained in this manner represents with high reliability the feature (degree of pressed-breathy sound) of the original speech data at each quasi-syllabic center. By calculating AQs for the quasi-syllabic centers and by interpolating the thus obtained AQs, it becomes possible to estimate AQ of a portion other than the quasi-syllabic centers. Accordingly, when an appropriate label corresponding to a prescribed AQ is attached as para-linguistic information to a portion of speech data that represents the prescribed AQ, and when the speech data having a desired AQ is used at the time of voice synthesis, speech synthesis including not only the text but also the para-linguistic information can be attained.

Figure 10:
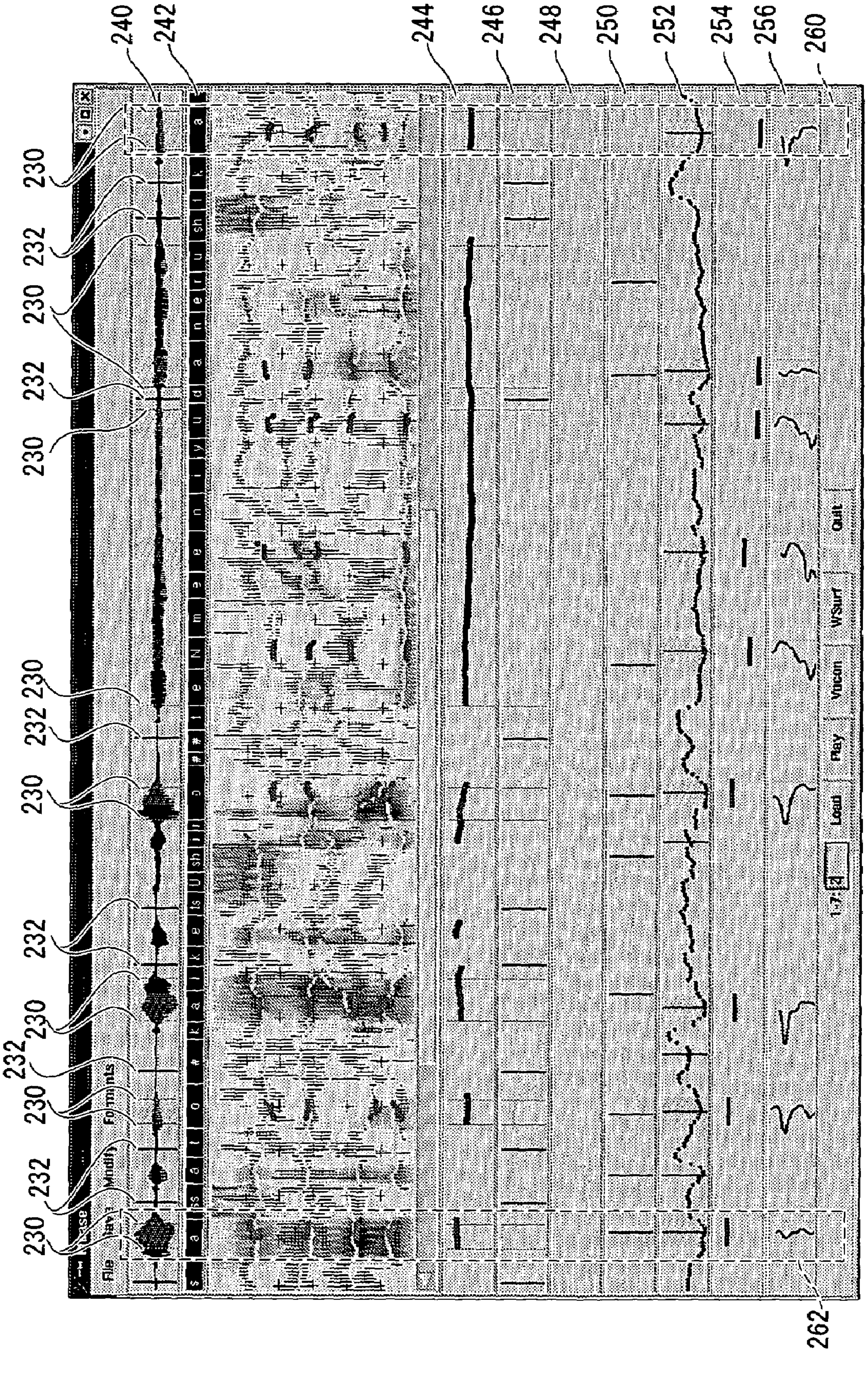
FIG. 10 is an exemplary display given by the program in accordance with an embodiment of the present invention.
Figure 11:
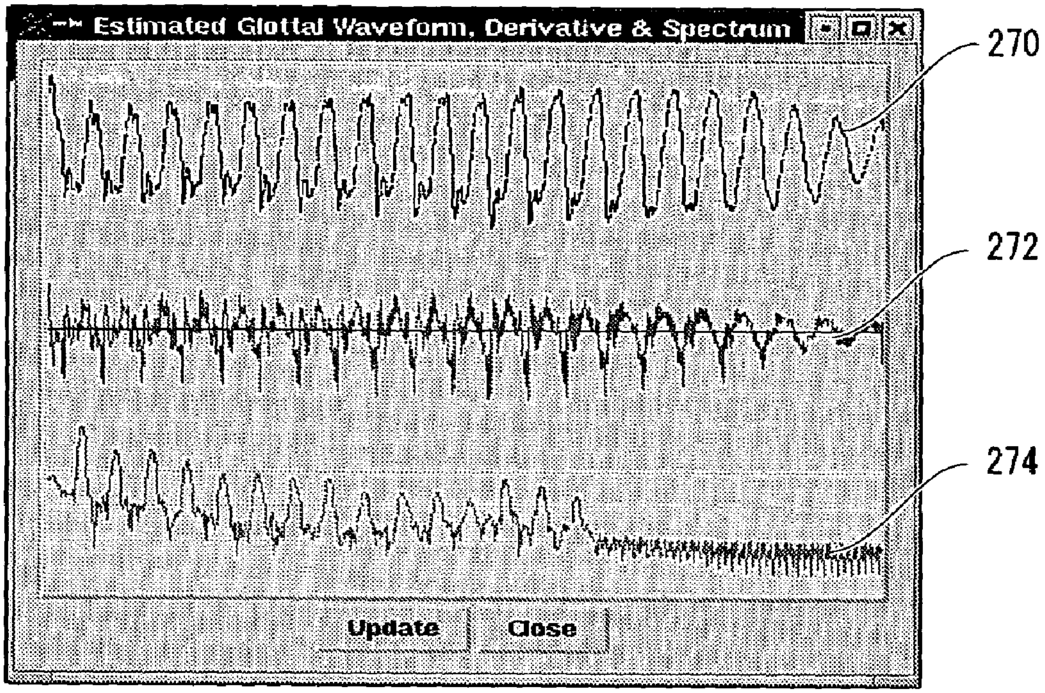
FIG. 11 shows an estimated glottal flow waveform, an estimated derivative of the glottal flow waveform, and a spectrum of the estimated glottal flow waveform, of a point of speech data that is determined to be a pressed sound.
Figure 12:
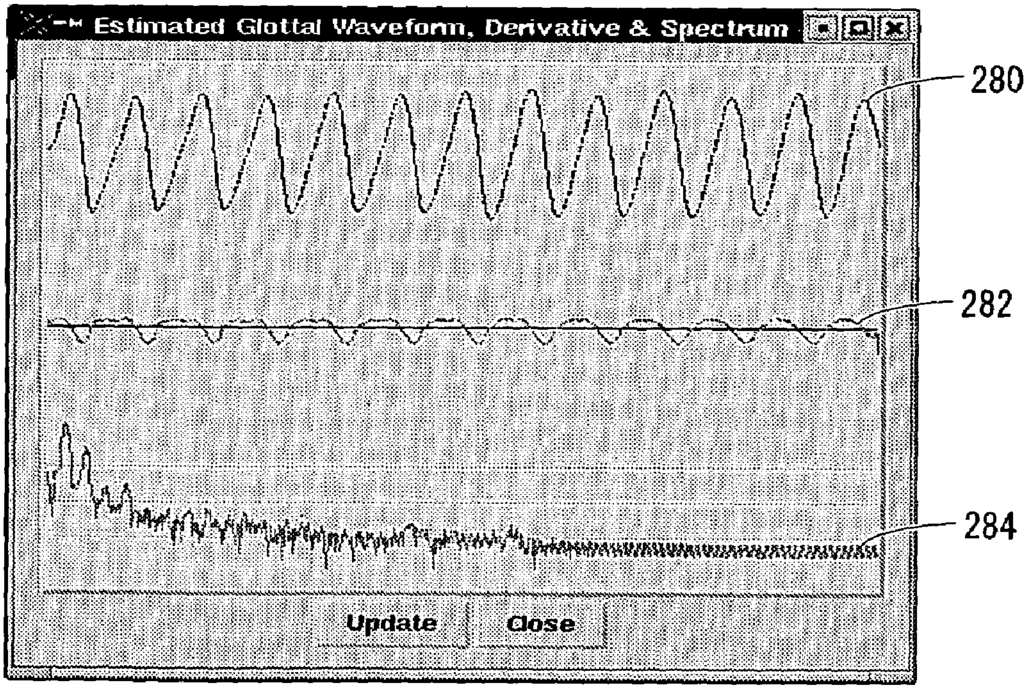
FIG. 12 shows an estimated glottal flow waveform, an estimated derivative of the glottal flow waveform, and a spectrum of the estimated glottal flow waveform, of a point of speech data that is determined to be a breathy sound.

FIGS. 10 to 12 are exemplary displays that appear when the apparatus of the present embodiment is implemented by a computer.

Referring to FIG. 10, in accordance with the program, the display window displays: speech data 240; speech label 242 attached to the speech data; a contour 244 of the distribution waveform on the time axis of reference frequency waveform; a contour 246 of the distribution waveform on the time axis of the sonorant energy variation; contour 248 of the distribution waveform on the time axis of local variance in spectral variation calculated from the A cepstrum; a contour 250 of the distribution waveform on the time axis of the formant-FFT cepstral distance; a contour 252 of the distribution waveform on the time axis of unreliability that is a waveform obtained by integrating the contour 248 of the distribution waveform on the time axis of local variance in spectral variation and the contour 250 of the distribution waveform on the time axis of the formant-FFT cepstral distance; AQs of the glottis at the pseudo-syllabic centers calculated in the above-described manner; and an area function of the vocal tract estimated at each pseudo-syllabic center.

The thick vertical lines 232 appearing in the display area of speech data waveform 240 and the thick vertical lines appearing in the display area of sonorant energy variation contour 246 represent boundaries of quasi-syllables. Thin vertical lines 230 appearing in the display area of speech data waveform 240 and thin vertical lines appearing in the display areas of sonorant energy variation contour 246 and reference frequency waveform contour 244 represent boundaries of pseudo-syllabic nuclei.

Vertical lines appearing in the display areas of unreliability waveform 252 represent local minima portions (dips) of the waveform, and the portion of which AQ is calculated with each dip being the center is the portion of highest reliability.

The period of calculation and the value of each AQ are represented by horizontal bar, and the higher the vertical position of horizontal bar, the closer becomes the sound to the pressed sound, and the lower the position, the closer to the breathy sound.

FIG. 11 shows the estimated glottal flow waveform 270, derivative 272 thereof, and spectrum 274 of the estimated glottal flow waveform, at the time point indicated by a dotted box 262 on the left side of FIG. 10. At the time point corresponding to box 262 of FIG. 10, the horizontal bar in the AQ display 254 is high (meaning AQ value is numerically low), that is, the sound is close to a pressed sound at this time point. As can be seen from FIG. 11, the waveform of the glottal flow at this time point is close to a saw tooth wave, and much different from a sine wave. The derivative waveform changes steeply.

FIG. 12 shows the estimated glottal flow waveform 280, derivative 282 thereof, and spectrum 284 of the estimated glottal flow waveform, at the time point indicated by a dotted box 260 of FIG. 10. At the time point corresponding to box 260 of FIG. 10, the horizontal bar in the AQ display 254 is low (meaning the AQ value is numerically high),that is, the sound is close to a breathy sound at this time point. As can be seen from FIG. 12, the waveform of the glottal flow at this time point is close to a clear sine curve.

Using the apparatus described above, the speech data were actually processed to extract pseudo-syllabic centers, and AQ of each pseudo-syllabic center was calculated. Correlation between the listener's impression when he/she hears the sound corresponding to such pseudo-syllabic centers and AQs was investigated in the following manner.

Using the above-described apparatus, 22,000 centers of reliability were extracted, and for each of the centers, corresponding glottal flow waveform and AQ, as well as RMS (Root Mean Square) energy (dB) of the original speech waveform were calculated. Of these centers of reliability, those existing in the same syllabic nuclei and having approximately the same AQs were combined, and further, among the centers of reliability, those having the integrated unreliability value not lower than 0.2 were disregarded. Consequently, the number of syllabic nuclei that were considered usable as the auditory stimuli was reduced to slightly over 15,000.

Based on statistics computed over this data set, a subset of 60 stimuli was selected to be used in a perceptual evaluation. In particular, for each of the three emotion databases described above, five syllabic nuclei were selected whose reliability centers have AQ belonging to either of the four categories: extremely low; extremely high; around the mean of AQs for respective emotions minus one standard-deviation ($\alpha$) of the distribution; and around the mean of AQs plus standard-deviation.

The durations of the 60 quasi-syllabic nuclei selected in this manner ranged from 32 msec to 560 msec, with a mean of 171 msec. Eleven normal-hearing subjects participated in an auditory evaluation of these short stimuli. The subjects listened to each stimulus as many times as required over high-quality headphones in a quiet office environment, and rated each on two separate, 7-point scales which were explained simply as "perceived breathiness" and "perceived loudness", respectively. The ratings of each subject were then proportionally normalized onto the range of [0, 1]. These normalized scores were averaged across all 11 subjects to obtain a mean value representing breathiness and of loudness for each of the 60 stimuli.

Figure 13:
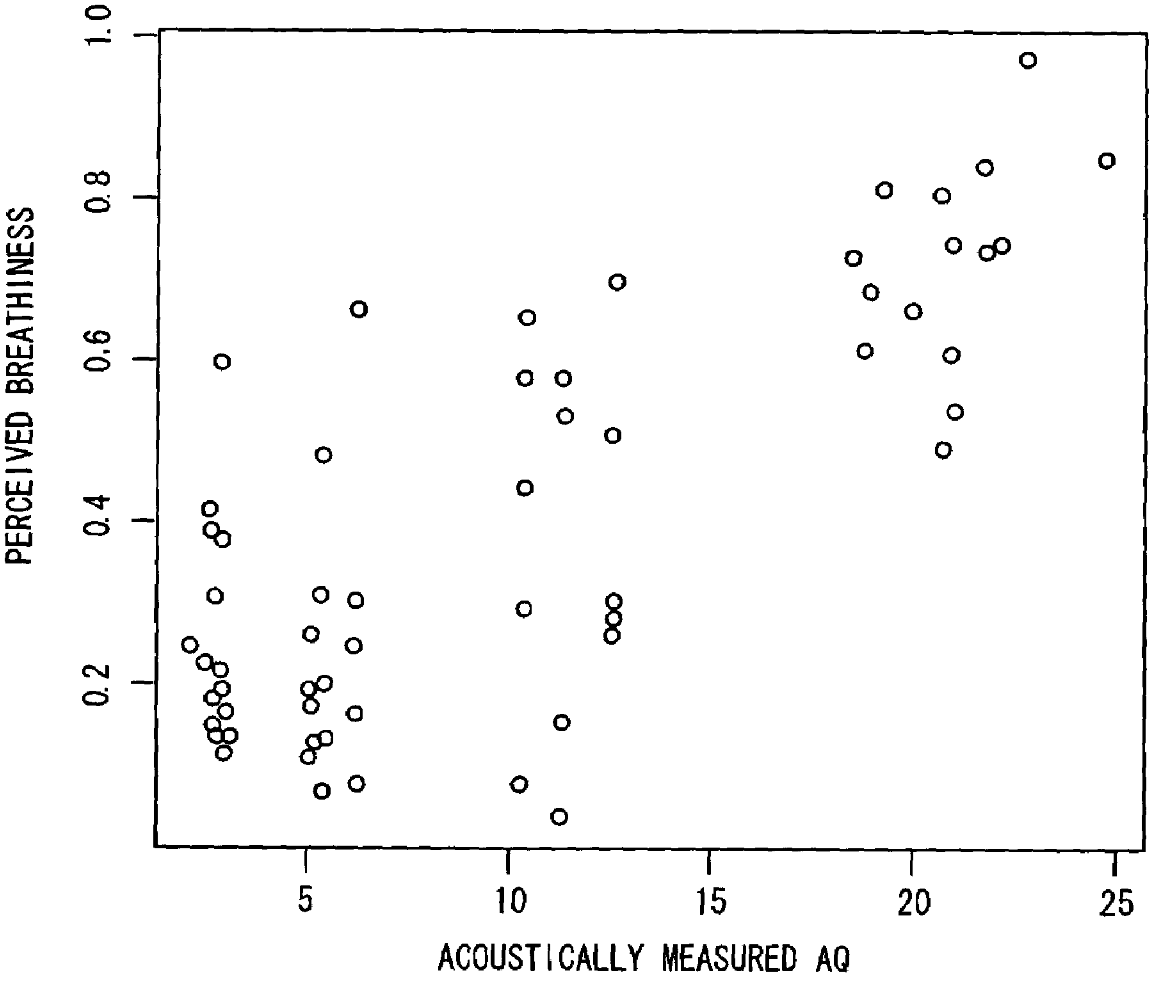
FIG. 13 is a scatter plot representing a relation between the sensed breathiness and acoustically measured AQ.

FIG. 13 is a scatter plot comparing the breathiness studied in the above-described manner and the acoustically-measured AQs. The linear coefficient of correlation for these 60 pairs of values was found to be 0.77. While this correlation is not particularly high, it supports an obvious trend that as the measured AQ increases, so too does the perceived breathiness of the speech stimulus on average. A closer examination of some of the points which lie furthest from an imaginary line of best fit on the scatter-plot, revealed some potential causes of error: formant discontinuities across the five frames, owing to a lack of dynamic constraints; a higher degree of breathiness during a part of the syllabic nucleus not included in the five frames; and strong influence of adjacent nasality of the vocalic portion within the five frames.

Furthermore, it is interesting to note from FIG. 13 that there is a greater range of perceived breathiness for those stimuli with a mid-to-low AQ. It confirms intuition that it is a more difficult task to rate the breathiness of stimuli which are perhaps better characterized by either modal or pressed phonation.

Though not shown in the figure, a scatter-plot was also prepared to compare the perceived loudness with the RMS energy measured in the same reliability centers. The correlation was found to be 0.83, thus confirming the strength of that relation despite not having used a more sophisticated, perceptually weighted measure of loudness.

As described above, the present embodiment realized a method and apparatus for (i) determining a position of a reliability center of quasi-syllabic nuclei in recorded natural speeches and for (ii) measuring sound source attributes quantified by AQs proposed in Reference 2, without necessitating any operator supervision. The result of voice perception experiments performed by using the method and apparatus confirmed the importance of AQ as values that enable robust measurement, having strong correlation with the perceived breathiness in the pseudo-syllabic nuclei. In fact, though there was such an error source as described in the foregoing, it could be confirmed that further study of AQ as a sound quality parameter is necessary, because of the correlation found between AQ and the perceived breathiness.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present method and apparatus enable automatic paralinguistic labeling of speech units without operator supervision, facilitating database construction. When continuous speech synthesization is performed using the database of the speech units with desired labeling thus realized, it becomes possible to realize a man-machine interface using natural speech synthesis using wide range of speech styles ranging from pressed sound through modal to breathy sound.

The invention claimed is:

1. An apparatus for determining, based on speech waveform data, a portion representing a feature of the speech waveform, comprising:

an acoustic/prosodic analysis unit which calculates, from said data, a distribution of energy of a prescribed frequency range of said speech waveform along a time axis, and extracts, among various syllables, a first portion of said speech waveform that is generated stably by a source of said speech waveform, based on the distribution of energy and pitch of said speech waveform;

a cepstral analysis unit which calculates, from said data, a frequency spectrum distribution of said speech waveform along the time axis, and estimates, based on the frequency spectrum distribution, a second portion of said speech waveform, for which change is well controlled by said source; and a pseudo-syllabic center extracting unit which determines the portion representing the feature of said speech waveform based on the first portion extracted by the acoustic/prosodic analysis unit and the second portion estimated by the cepstral analysis unit, wherein said cepstral analysis unit includes:

a linear prediction analysis unit which performs linear prediction analysis on said speech waveform and outputting an estimated value of formant frequency;

a cepstral distance calculating unit which calculates, using said data, a distribution of cepstral distance on the time axis based on the estimated value of formant frequency provided by said linear prediction analysis unit;

an inter-frame variance calculating unit which calculates, based on an output from said linear prediction analysis unit, distribution of local variance of magnitude of delta cepstrum of said speech waveform on the time axis; and a reliability center candidate output unit which estimates, based both on said distribution of cepstral distance on the time axis based on the estimated value of formant frequency calculated by said cepstral distance calculating unit and on said distribution on the time axis of local variance of magnitude of delta cepstrum of said speech waveform calculated by said inter-frame variance calculating unit, a range in which change in the speech waveform is well controlled by said source.

2. The apparatus according to claim 1, wherein said acoustic/prosodic analysis unit includes:

a pitch determining unit which determines, based on said data, whether each segment of said speech waveform is a voiced segment or not, a dip detecting unit which separates said speech waveform into syllables at a local minimum of said waveform of energy distribution of the prescribed frequency range of said speech waveform on the time axis; and a voiced/energy determining unit which extracts that range of said speech waveform which includes, in each syllable, an energy peak in that syllable within the segment determined to be a voiced segment by said pitch determining unit and in which the energy of the prescribed frequency range is not lower than a prescribed threshold value.

3. The apparatus according to claim 1, wherein said pseudo-syllabic center extracting unit determines a range, included in the first portion of said speech waveform extracted by said acoustic/prosodic analysis unit, within which change in said speech waveform is estimated by said cepstral analysis unit to be well controlled by said source.

4. An apparatus as recited in claim 1, wherein said cepstral analysis unit is configured to calculate, from said data, a frequency spectrum distribution of said speech waveform along the time axis, and estimate the second portion, based on the frequency spectrum distribution, as a portion where local variance of changes of the frequency spectrum is at a local minimum.

5. An apparatus as recited in claim 1, wherein said cepstral distance calculating unit includes:

a cepstrum re-generating unit connected to receive said estimated value of formant frequency from said linear prediction analysis unit, for recalculating cepstrum coefficients based on said value of formant frequency; and a logarithmic transformation and inverse discrete cosine transformation unit connected to receive said speech waveform data for calculating FFT cepstrum coefficients based on said waveform data, wherein the cepstral distance calculating unit is configured to calculate cepstrum distance between the cepstrum coefficients recalculated by said cepstrum re-generating unit and the FFT cepstrum coefficients calculated by said a logarithmic transformation and inverse discrete cosine transformation unit, said cepstrum distance indicating a distribution of unreliability; and said cepstral analysis unit includes:

a standardizing and integrating unit which combines the cepstrum distance and the distribution on the time axis of local variance of spectral change and outputting a combined data, wherein the reliability center candidate output unit estimates the range in which change in the speech waveform is well controlled by said source at a dip of the combined data output by said standardizing and integrating unit.

6. A storage medium readable by a computer, the medium having data stored thereon, the data, when executed by a processor of the computer, causes the processor to operate as an apparatus for determining, based on speech waveform data, a portion representing a feature of the speech waveform, said apparatus comprising:

an acoustic/prosodic analysis unit which calculates, from said data, distribution of energy of a prescribed frequency range of said speech waveform along a time axis, and extracting, among various syllables, a first portion of said speech waveform that is generated stably by a source of said speech waveform, based on the distribution of energy and pitch of said speech waveform;

a cepstral analysis unit which calculates, from said data, a frequency spectrum distribution of said speech waveform along the time axis, and estimating, based on the frequency spectrum distribution, a second portion of said speech waveform, for which change is well controlled by said source; and a pseudo-syllabic center extracting unit which determines the portion representing a feature of said speech waveform based on the first portion extracted by the acoustic/prosodic analysis unit and the second portion, wherein said cepstral analysis unit includes:

a linear prediction analysis unit which performs linear prediction analysis on said speech waveform and outputting an estimated value of formant frequency;

a cepstral distance calculating unit which calculates, using said data, a distribution of cepstral distance on the time axis based on the estimated value of formant frequency provided by said linear prediction analysis unit;

an inter-frame variance calculating unit which calculates, based on an output from said linear prediction analysis unit, distribution of local variance of magnitude of delta cepstrum of said speech waveform on the time axis; and a reliability center candidate output unit which estimates, based both on said distribution of cepstral distance on the time axis based on the estimated value of formant frequency calculated by said cepstral distance calculating unit and on said distribution on the time axis of local variance of magnitude of delta cepstrum of said speech waveform calculated by said inter-frame variance calculating unit, a range in which change in the speech waveform is well controlled by the source.

7. The medium according to claim 6, wherein said acoustic/prosodic analysis unit includes:

a pitch determining unit which determines, based on said data, whether each segment of said speech waveform is a voiced segment or not, a dip detecting unit which separates said speech waveform into syllables at a local minimum of said waveform of energy distribution of the prescribed frequency range of said speech waveform on the time axis; and a voiced/energy determining unit which extracts that range of said speech waveform which includes, in each syllable, an energy peak in that syllable within the segment determined to be a voiced segment by said pitch determining unit and in which the energy of the prescribed frequency range is not lower than a prescribed threshold value.

8. The medium according to claim 6, wherein said pseudo-syllabic center extracting unit determines a range, included in the first portion of said speech waveform extracted by said acoustic/prosodic analysis unit, within which change in speech waveform is estimated by said cepstral analysis unit to be well controlled by said source.

9. The medium according to claim 6, wherein said cepstral distance calculating unit includes:

a cepstrum re-generating unit connected to receive said estimated value of formant frequency from said linear prediction analysis unit, for recalculating cepstrum coefficients based on said value of formant frequency; and a logarithmic transformation and inverse discrete cosine transformation unit connected to receive said speech waveform data for calculating FFT cepstrum coefficients based on said waveform data, wherein the cepstral distance calculating unit is configured to calculate cepstrum distance between the cepstrum coefficients recalculated by said cepstrum re-generating unit and the FFT cepstrum coefficients calculated by said a logarithmic transformation and inverse discrete cosine transformation unit, said cepstrum distance indicating a distribution of unreliability; and said cepstral analysis unit includes:

a standardizing and integrating unit which combines the cepstrum distance and the distribution on the time axis of local variance of spectral change and outputting a combined data, wherein the reliability center candidate output unit estimates the range in which change in the speech waveform is well controlled by said source at a dip of the combined data output by said standardizing and integrating unit.

10. A method of extracting from a speech waveform data a portion representing a feature of the speech waveform, comprising the steps of:

calculating, from said data, a distribution of energy of a prescribed frequency range of said speech waveform along a time axis, and extracting, among various syllables, a first portion of said speech waveform, that is generated stably by a source of said speech waveform, based on the distribution of energy and pitch of said speech waveform;

calculating, from said data, a frequency spectrum distribution of said speech waveform along the time axis, and estimating, based on the frequency spectrum distribution, a second portion of said speech waveform, for which change is well controlled by said source; and extracting the portion representing a feature of said speech waveform based on the first portion and the second portion, wherein said estimating step includes:

performing linear prediction analysis on said speech waveform and outputting an estimated value of formant frequency;

calculating, using said data, a distribution of cepstral distance on the time axis based on the estimated value of formant frequency provided in said step of outputting the estimated value;

calculating, based on the calculated distribution based on the estimated value of formant frequency, distribution of local variance of magnitude of delta cepstrum of said speech waveform on the time axis; and estimating, based both on said calculated distribution of cepstral distance on the time axis related to the estimated value of formant frequency and on said calculated distribution on the time axis of local variance of magnitude of delta cepstrum of said speech waveform, a range in which change in the speech waveform is well controlled by said source.

11. The method according to claim 10, wherein said step of extracting a first portion of said speech waveform includes the steps of:

determining, based on said data, whether each segment of said speech waveform is a voiced segment or not, detecting a local minimum of said waveform of energy distribution of the prescribed frequency range of said speech waveform on the time axis, and separating said speech waveform into syllables at the local minimum; and extracting that range of said speech waveform which includes, in each syllable, an energy peak in that syllable within a segment determined to be a voiced segment and in which the energy of the prescribed frequency range is not lower than a prescribed threshold value.

12. The method according to claim 10, wherein said step of extracting the portion representing a feature of said speech waveform includes the step of:

determining a range, included in the first portion of said speech waveform, within which change in said speech waveform is estimated in said estimating step to be well controlled by said source.

13. The method according to claim 10, wherein said step of calculating a distribution of cepstral distance includes:

receiving said estimated value of formant frequency, and recalculating cepstrum coefficients based on said value of formant frequency;

receiving said speech waveform data for calculating FFT cepstrum coefficients based on said waveform data; and calculating cepstrum distance between the recalculated cepstrum coefficients and the FFT cepstrum coefficients, said cepstrum distance indicating a distribution of unreliability; and wherein said estimating step further includes:

combining the cepstrum distance and the distribution on the time axis of local variance of spectral change and outputting a combined data; and estimating the range in which change in the speech waveform is well controlled by said source at a dip of the combined data.

* * * * *